United States Patent [19]

Kawano et al.

[11] Patent Number: 4,930,955
[45] Date of Patent: Jun. 5, 1990

[54] APPARATUS AND METHOD FOR CLAMPING A WORK PIECE FOR MACHINING THEREOF

[75] Inventors: Satoshi Kawano, Tamamura; Yoshio Kimura, Maebashi; Eiji Fukushima, Fujimi, all of Japan

[73] Assignee: Sanden Corporation, Japan

[21] Appl. No.: 316,099

[22] Filed: Feb. 28, 1989

[30] Foreign Application Priority Data

Feb. 29, 1988 [JP] Japan ................... 63-44495

[51] Int. Cl.$^5$ .............................................. B23Q 3/00
[52] U.S. Cl. ........................................ 409/225; 269/54; 269/54.4; 269/156; 279/110; 409/219
[58] Field of Search .................. 279/1 L, 1 S, 66, 67, 279/93, 110, 112; 409/219, 224, 225; 269/53, 54, 54.4, 156

[56] References Cited

U.S. PATENT DOCUMENTS

| | | | |
|---|---|---|---|
| 1,349,963 | 8/1920 | Jerrim | 269/156 |
| 1,372,661 | 3/1921 | Secord | 269/156 |
| 2,524,006 | 9/1950 | Capellazzi | 279/15 |
| 2,541,605 | 2/1951 | Ohlsson | 269/156 |
| 2,955,820 | 10/1960 | Berg | 269/54 |
| 4,286,778 | 9/1981 | Follmeyer | 409/225 |
| 4,433,564 | 2/1984 | Fukushima et al. | |
| 4,436,465 | 3/1984 | Fukushima et al. | |
| 4,456,051 | 6/1984 | Hukuhara | |
| 4,487,248 | 12/1984 | Fukushima et al. | |
| 4,572,276 | 2/1986 | Hukuhara | |

*Primary Examiner*—Daniel Howell
*Attorney, Agent, or Firm*—Banner, Birch, McKie & Beckett

[57] ABSTRACT

A chuck for clamping a discoid portion of a work piece includes a base, at least two fixed clamps secured on a front end surface of the base, a movable clamp adjacent to the front end surface of the base and a pin secured to the front end surface of the base. The pin is adapted to fit in a hole formed in the discoid when the discoid is mounted on the chuck wherein the hole has a larger diameter than the pin. Furthermore, the pin is positioned radially inwardly of the movable clamp toward the chuck center and oriented so that the two fixed clamps are equiangularly spaced about and equidistantly spaced from the pin. As a result, the discoid may move relative to the pin and toward the two fixed clamps, without rotation thereof. Accordingly, the centroidal axis of the discoid may be aligned with the rotational axis of the chuck so that precision machining may be achieved.

18 Claims, 3 Drawing Sheets

APPARATUS AND METHOD FOR CLAMPING A WORK PIECE FOR MACHINING THEREOF

TECHNICAL FIELD

This invention broadly relates to an apparatus and method for clamping a work piece for machining thereof. More particularly, the present invention relates to a lathe chuck for clamping a discoid portion of a work, which is suitable for manufacturing a scroll for use in a scroll type fluid displacement apparatus, and a method for clamping the work in the chuck.

BACKGROUND OF THE INVENTION

A perspective view of a prior art chuck is shown in FIG. 1. Chuck 10, suitable for use in a lathe, includes circular base portion 11, annular projection 12, fixed clamps 13 and 14, and movable clamp 15. Annular projection 12 axially projects from a front end surface of base portion 11 to support work 20. Fixed clamps 13 and 14 are positioned radially outwardly from annular projection 12 and are fixedly secured on the front end surface of base portion 11. Movable clamp 15 comprises generally L-shaped block 151, screw 152 and clamping portion 153. L-shaped block 151 is fixedly secured to an outer peripheral surface of base portion 11. Clamping portion 153, positioned between annular projection 12 and block 151, is fixedly secured on the front end surface of base portion 11. Screw 152 passes through a threaded bore in an upper portion of block 151 to engage and move clamping portion 153 radially inwardly. More specifically, rotation of screw 152 forces or bends an upper part of clamping portion 153 radially inwardly along dashed line 16. Dashed lines 16, 17 and 18 represent the three-dimensional X, Y and Z axes for chuck 10, respectively. Dashed line 18 passes through the radial center of base portion 11 and corresponds to the centroidal axis of annular projection 12. Radial center $O_M$ of base portion 11 is depicted in FIG. 2. Cut-out portion 121a is formed in annular projection 12 within the first quadrant defined by the X and Y axes. Pin member 19a is fixedly disposed within cut-out portion 121a. Pin member 19a is generally prismatic within generally rhombic bases so that a transverse section thereof is generally rhombic. However, only a portion of pin member 19a may be prismatic. Alternatively, pin member 19a may have rhombic transverse sections without being prismatic.

Work 20 includes discoid portion 21 and machining portion 22 fixedly secured on a front end surface of discoid portion 21. Cylindrical hole 211a is axially bored into a rear end surface of discoid portion 21 and has a diameter slightly larger than the longer diagonal distance of the rhombic base or rhombic transverse section of pin member 19a. Therefore, hole 211a may receive pin 19a. The longer diagonal distance is designated as $D_1$ in FIG. 1 and is defined by the longer diagonal line of the rhombic base or rhombic transverse section of pin member 19a.

Fixed clamps 13 and 14 and movable clamp 15 preferably are equiangularly spaced. Furthermore, each inner surface of fixed clamps 13 and 14 and clamping portion 153 is preferably arc-shaped with a radius of curvature corresponding to the radius of curvature of the outer peripheral surface of discoid portion 21.

The sequence of mounting work 20 on chuck 10 is as follows. Work 20 is placed on an end surface of annular projection 12 so that pin member 19a enters hole 211a. Once work 20 is so positioned, fixed clamps 13 and 14 and clamping portion 153 surround work 20. The, screw 152 is turned to force clamping portion 153 radially inwardly by bending an upper portion thereof along axis 16. As a result, clamping portion 153 firmly clamps discoid portion 21 against fixed clamps 13 and 14. Referring to FIG. 2, the solid and dashed lines represent before clamping and clamped situations, respectively.

However, during the clamping step of discoid portion 21 wherein clamping portion 153 forces discoid portion 21 against fixed clamps 13 and 14, work 20 may undergo undesirable motion. More specifically, work 20 may rotate about the longitudinal axis or rhombic center point Op of pin member 19a in response to the bending force of clamping portion 153. Such undesirable angular displacement is designated by α in FIG. 2. In turn, such angular displacement of work 20 would shift the radial center of work 20 from $O_W$ to $O'_W$ as illustrated in FIG. 2. As a result, the radial center of work 20 may not be aligned with radial center $O_M$ of base portion 11 and chuck 10. Accordingly, accurate of precise machining of portion 22 is sacrificed. Consequently, the above described prior art chuck would not be suitable for machining parts such as scrolls used in scroll type fluid displacement apparatus wherein dimensional precision is critical.

SUMMARY OF THE INVENTION

In view of the above and other deficiencies of the known prior art, it is an object of the present invention to provide a chuck that affords accurate centering of the work in the chuck.

It is another object of the present invention to provide a lathe chuck suitable for precision machining.

It is a further object of the present invention to provide a chuck with a clamping mechanism which prevents rotation of the work during clamping and enables alignment of the centroidal axis of the work with the rotational axis of the chuck.

Thus, the invention involves a chuck for clamping a discoid portion of a work. The chuck includes a base, at least two fixed clamps secured on a front end surface of the base, a movable clamp adjacent to the front end surface of the base and a pin secured to the front end surface of the base. The pin is adapted to fit in a hole formed in the discoid when the discoid is mounted on the chuck. Furthermore, the pin is positioned radially inwardly of the movable clamp toward the chuck center and oriented so that the at least two fixed clamps are equiangularly spaced about and equidistantly spaced from the pin. The orientation of the pin allows the discoid to move relative to the pin and toward the at least two fixed clamps, while preventing rotation of said discoid.

Other important features and advantages of the invention will be apparent from the following description and the accompanying drawings, wherein for purpose of illustration only, a specific form of the invention is shown in detail.

DETAILED DESCRIPTION OF THE PREFERRED EMBODIMENT

Figure 3:
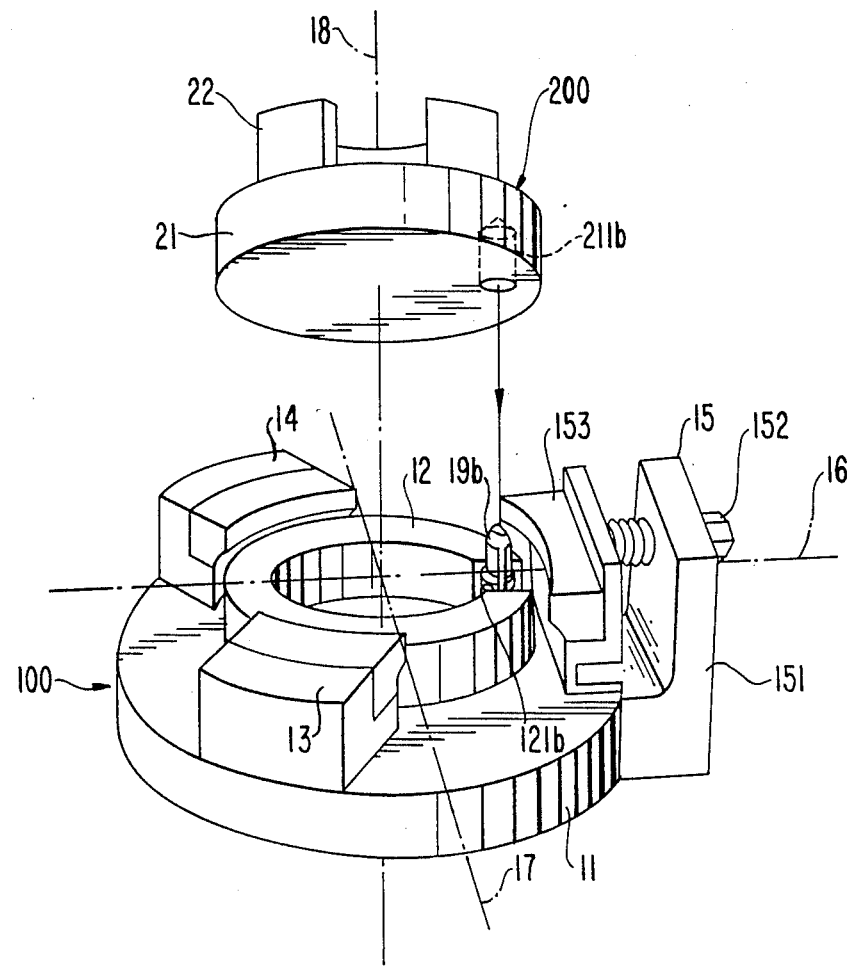
FIG. 3 is a perspective view of a chuck in accordance with a preferred embodiment of the present invention with the work shown thereabove.

Referring to the drawings in detail, wherein like numerals indicate like elements, FIG. 3 shows a chuck in accordance with a preferred embodiment of the present invention. In chuck 100, cut-out portion 121b is formed in a portion of annular projection 12 and is centered before the inner surface of clamping portion 153 so that cut-out portion 121b is aligned with line 16. Accordingly, fixed clamps 13 and 14 are equiangularly spaced about and equidistantly spaced from cut-out portion 121b. Pin member 19b is fixedly disposed within cut-out portion 121b so that fixed clamps 13 and 14 also are equiangularly spaced about and equidistantly spaced from pin 19b. Pin member 19b is generally prismatic with generally rhombic bases. Alternatively, only a portion of the pin 19b may have a generally rhombic transverse section. Furthermore, pin 19b is positioned so that shorter diagonal line $D_S$ of its rhombic base or rhombic section is parallelly aligned with line 16. Accordingly, fixed clamps 13 and 14 are equiangularly spaced about and equidistantly spaced from any point on diagonal line $D_S$. Cylindrical hole 211b is axially bored in a rear end surface of discoid portion 21. The diameter of of hole 211b is slightly larger than the length of longer diagonal line $D_l$ of the rhombic base or rhombic transverse section of pin member 19b.

Figure 4:
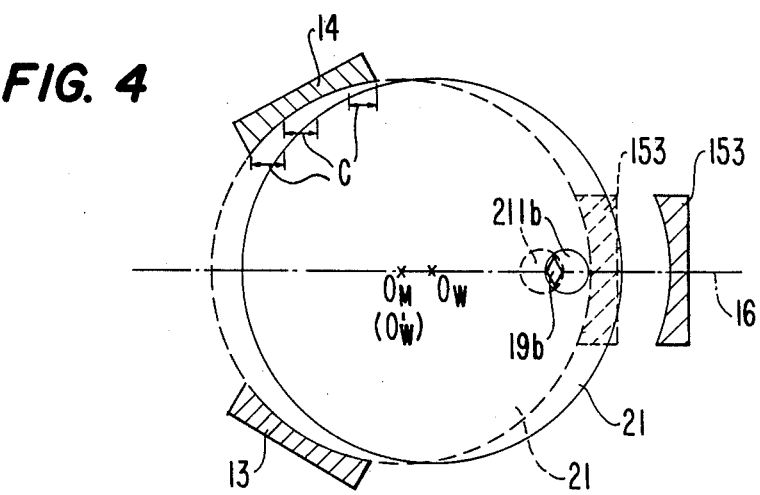
FIG. 4 is a partial plan view of the chuck of FIG. 3 diagrammatically showing the linear displacement of the work during the clamping step.

The sequence of mounting work 200 on chuck 100 is as follows. Work 200 is placed on an end surface of annular projection 12 so that pin member 19b enters hole 211b. Once work 200 is so positioned, fixed clamps 13 and 14 and clamping portion 153 surround work 200. Then, screw 152 is turned to force clamping portion 153 radially inwardly by bending an upper part thereof along axis 16. As a result, clamping portion 153 firmly clamps discoid portion 21 against fixed clamps 13 and 14. Referring to FIG. 4, the solid and dashed lines represent before clamping and clamped situations, respectively.

Figure 1:
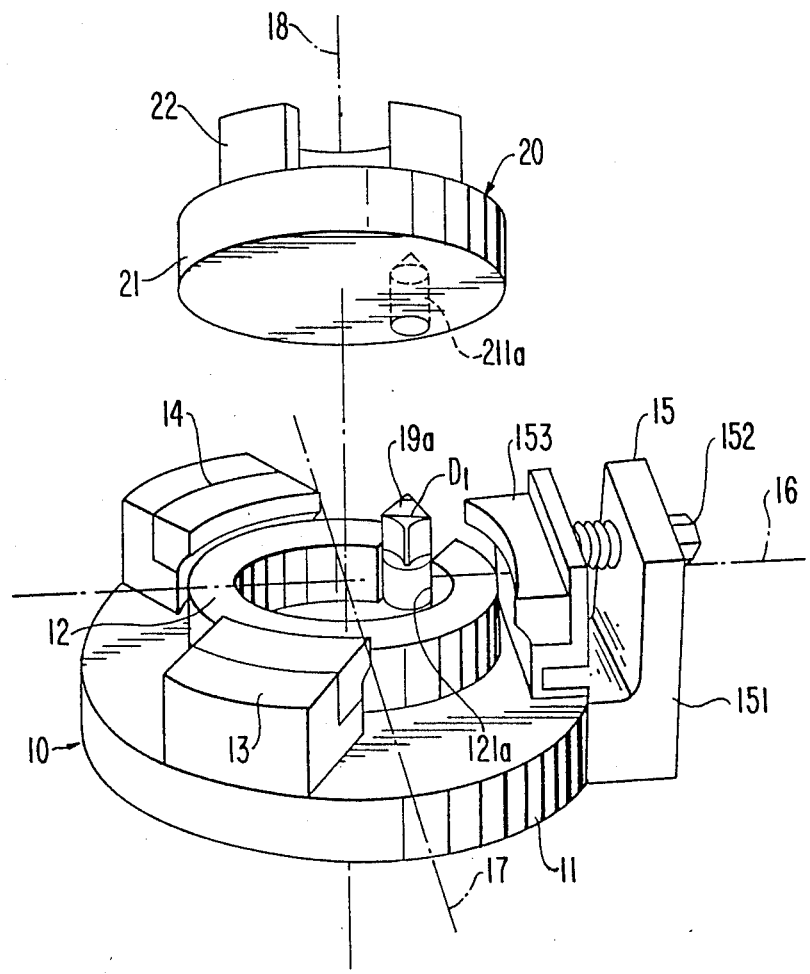
FIG. 1 is a perspective view of a chuck in accordance with the prior art with the work shown thereabove.
Figure 2:
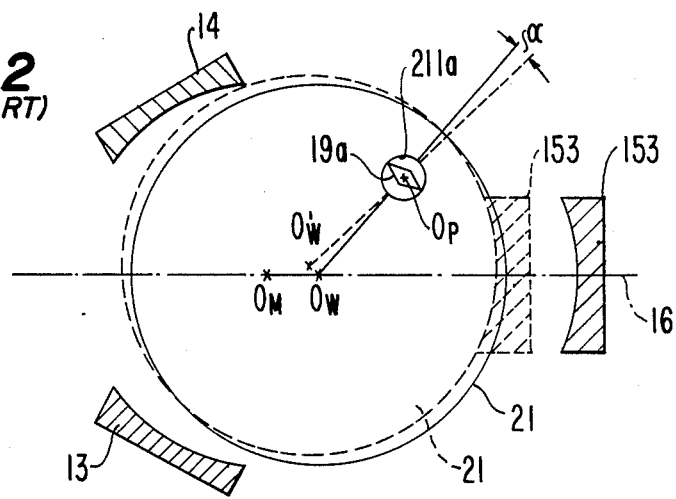
FIG. 2 is a partial plan view of the chuck and work of FIG. 1 diagrammatically showing the linear and angular displacement of the work during the clamping step.

In contrast to the prior art depicted in FIG. 2, clamping portion 153 moves work 200 and discoid 21 linearly toward fixed clamps 13 and 14, i.e., along line 16, without rotation of work 200 (see FIG. 4). As a result, the radial center of work 200 shifts from $O_W$ to $O'_W$ so that the radial center of work 200 is aligned with radial center $O_M$ of base portion 11 which forms the master center of chuck 100. Consequently, work 200 is centered in chuck 100.

Figure 5:
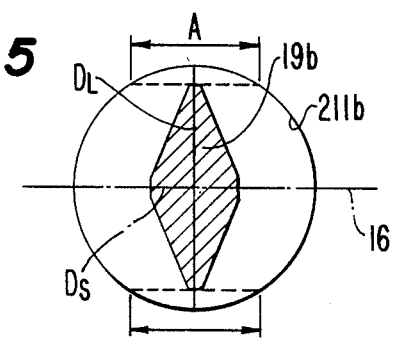
FIG. 5 is a transverse cross-sectional view of the pin member shown in FIG. 3 and its relative position to a hole formed in the work.

Referring to FIG. 5, two edges of pin member 19b are cut to shorten longer diagonal $D_L$ of the rhombic section so that work 200 may move along line 16 relative to pin 19b a distance A during the clamping step. Distance A is defined by the following relation.

A = (the predetermined initial clearance (C) between discoid portion 21 and fixed clamps 13, 14) + (one-half of the variation in discoid diameter between an ideal discoid and the actual discoid mounted in chuck 100)

However, when such discoid variation, or error, is minimal, distance A may be determined without including the specific variation. Therefore, distance A is generally determined as being slightly greater than clearance C. Returning to FIG. 4, clearance C is measured along a line parallel to line 16 which is the line along which clamping portion 153 moves.

Having described the invention in detail, it will be recognized that the foregoing is considered as illustrative only of the principles of the invention. Since numerous modifications and changes will readily occur to those skilled in the art, it is not desired to limit the invention to the exact construction shown and described. Accordingly, all suitable modifications and equivalents may be restored to the extent they fall within the scope of the invention and claims appended hereto.

We claim:

1. A chuck for clamping a discoid portion of a work piece, said chuck having a center and including a base, at least two fixed clamps secured on a front end surface of said base, a movable clamp having a center, adjacent to said front end surface and movable toward said two fixed clamps, and a pin secured to said front end surface of said base and adapted to fit within a hole formed in said discoid when said discoid is mounted on said chuck, the improvement comprising:

said pin being positioned radially inwardly of said movable clamp on an axis between the center of said movable clamp and the chuck center and oriented so that said two fixed clamps are equiangularly spaced from said axis and equidistantly spaced from said pin.

2. The chuck according to claim 1 wherein said pin has a generally rhombic transverse section with a longer and a shorter diagonal.

3. The chuck according to claim 2 wherein the shorter diagonal of said generally rhombic section forms a line directed toward the center of said chuck.

4. The chuck according to claim 3 wherein said two fixed clamps are equiangularly spaced about an axis formed by said shorter diagonal and equidistantly spaced from any point on said shorter diagonal.

5. The chuck according to claim 1 further including an annular projection having a centroid axis and secured on said front end surface of said base for supporting said discoid, and said two fixed clamps and said movable clamp surrounding said annular projection.

6. The chuck according to claim 5 wherein said annular projection includes a cut-out portion and said pin is disposed therein.

7. The chuck according to claim 5 wherein said pin has a generally rhombic transverse section, the shorter diagonal of said generally rhombic section forms a line which is colinear with a line that intersects the centroidal axis of said annular projection.

8. A chuck for clamping a discoid portion of a work piece, said chuck including a base, two fixed clamps secured on a front end surface of said base, a movable clamp adjacent said front end surface, and a pin secured to said front end surface of said base and adapted to fit within a hole formed in said discoid when said discoid is mounted on said chuck, each said fixed clamp having an inner surface adapted to cooperate with the outer peripheral surface of said discoid, the improvement comprising:

said pin member being positioned on a line which passes through said movable clamp and which bisects an arc defined by said inner surface and positioned between said fixed clamps.

9. A chuck according to claim 8 wherein said pin has a generally rhombic transverse section and the shorter diagonal thereof runs parallel to said bisecting line.

10. The chuck according to claim 9 further including an annular projection secured on said front end surface of said base portion for supporting said discoid, said two fixed clamps and said movable clamp surrounding said annular projection, and said bisecting line passing through the centroidal axis of said annular projection.

11. A method of mounting a work piece in a chuck for subsequent machining thereof comprising the steps of:
  (a) providing a chuck with a base, at least two fixed clamps secured on a front end of said base, a movable clamp adjacent to said front end surface and radially movable toward said two fixed clamps, and a pin secured to said front end surface of said base;
  (b) providing a work piece with a discoid portion having a hole formed in an end surface thereof and a centroidal axis;
  (c) placing said discoid portion on said chuck within said two fixed clamps and said movable clamp while sliding said discoid hole over said pin; and
  (d) moving said discoid towards said at least two fixed clamps along a line intersecting the center of said discoid and the center of said pin to prevent rotation of said discoid.

12. The method of mounting a work piece in a chuck according to claim 11 wherein said discoid moving step includes forcing said movable clamp against said discoid.

13. The method of mounting a work piece in a chuck according to claim 11 wherein said discoid moving step includes maintaining said two fixed clamps equiangularly spaced about a central axis passing through said discoid hole and said movable clamp.

14. The method of mounting a work piece in a chuck according to claim 11 wherein said chuck providing step further includes providing said chuck with an annular discoid support having a centroidal axis and positioning said pin therein, said discoid placing step includes placing said discoid on said annular discoid support, and said discoid moving step includes moving said discoid into a position wherein the centroidal axes of said annular discoid support and said discoid are aligned.

15. The method of mounting work piece in a chuck according to claim 14 wherein said chuck providing step includes providing said base with a circular configuration having a centroidal axis and concentrically positioning said annular discoid support on said circular base so that the centroidal axes of said annular discoid support and said circular base are aligned.

16. The chuck according to claim 3 wherein said pin is truncated at both ends thereof of along said longer diagonal by a predetermined amount to allow for limited movement of said discoid relative to said pin along a line formed by said shorter diagonal.

17. A method of mounting a work piece in a chuck for subsequent machining thereof comprising the steps of:
  (a) providing a chuck with a base, at least two fixed clamps secured on a front end of said base, a movable clamp adjacent to said front end surface and radially movable toward said two fixed clamps, and a pin secured to said front end surface of said base;
  (b) providing a work piece with a discoid portion having a hole formed in an end surface thereof;
  (c) placing said discoid portion on said chuck within said two fixed clamps and said movable clamps while sliding said discoid hole over said pin; and
  (d) moving said discoid relative to said pin and toward said two fixed clamps, while preventing rotation of said discoid, wherein said discoid moving step includes maintaining said two fixed clamps equiangularly spaced about said discoid hole.

18. The method of mounting a work piece in a chuck according to claim 17 wherein said step of preventing rotation of said discoid further comprises the step of providing said pin on a central axis between said movable clamp and a point equidistant from each of said two fixed clamps.

* * * * *